(12) United States Patent
Gilbreath

(10) Patent No.: US 9,732,892 B2
(45) Date of Patent: Aug. 15, 2017

(54) QUICK CONNECT COUPLING WITH A SELF-RESETTING RETENTION MECHANISM

(71) Applicant: The Gates Corporation, Denver, CO (US)

(72) Inventor: Donald R. Gilbreath, Castle Rock, CO (US)

(73) Assignee: Gates Corporation, Denver, CO (US)

( * ) Notice: Subject to any disclaimer, the term of this patent is extended or adjusted under 35 U.S.C. 154(b) by 577 days.

(21) Appl. No.: 13/737,040

(22) Filed: Jan. 9, 2013

(65) Prior Publication Data

US 2014/0191502 A1   Jul. 10, 2014

(51) Int. Cl.
*F16L 37/088*   (2006.01)

(52) U.S. Cl.
CPC .................. *F16L 37/088* (2013.01)

(58) Field of Classification Search
USPC .................. 285/39, 305, 307–309
See application file for complete search history.

(56) References Cited

U.S. PATENT DOCUMENTS

| 4,240,654 A |   | 12/1980 | Gladieux |            |
|-------------|---|---------|----------|------------|
| 4,863,201 A | * | 9/1989  | Carstens | F16L 37/42 |
|             |   |         |          | 285/308    |
| 4,872,710 A | * | 10/1989 | Konecny et al. | 285/81 |
| 5,226,680 A | * | 7/1993  | Bahner | F16L 37/101 |
|             |   |         |        | 285/314 |
| 5,284,369 A | * | 2/1994  | Kitamura | F16L 37/0985 |
|             |   |         |          | 285/316 |
| 5,988,706 A | * | 11/1999 | Hollnagel | F16L 35/00 |
|             |   |         |           | 285/308 |
| 6,065,779 A | * | 5/2000  | Moner | F16L 37/0925 |
|             |   |         |       | 285/308 |
| 6,231,084 B1 | * | 5/2001 | Hester | F16L 37/088 |
|             |   |        |        | 285/307 |
| 6,637,781 B1 |   | 10/2003 | Seymour |          |
| 6,857,664 B2 | * | 2/2005  | Ohlsson | F16L 37/0982 |
|             |   |         |         | 285/319 |
| 7,014,215 B2 |   | 3/2006  | Cooper et al. |     |
| 7,469,933 B2 |   | 12/2008 | Swift et al. |      |

(Continued)

FOREIGN PATENT DOCUMENTS

DE   19932307 A1   1/2001
DE   10309725 B3   4/2004

(Continued)

OTHER PUBLICATIONS

European Patent Office, International Search Report, dated Mar. 27, 2014.

*Primary Examiner* — David E Bochna
(74) *Attorney, Agent, or Firm* — Paul N. Dunlap, Esq.; Jeffrey A. Thurnau, Esq.

(57) ABSTRACT

A quick connect coupling includes a male coupling and a female coupling. A stop may be associated with the male coupling and configured to prevent the male coupling from being inserted into a port of the female coupling beyond a predetermined depth. The stop may be axially slidable between a first position and a second position. The first position may be located between a leading edge of the male coupling and the second position. The stop may be biased towards the first position so that the stop substantially resets to the first position.

17 Claims, 5 Drawing Sheets

(56) References Cited

U.S. PATENT DOCUMENTS

| | | | |
|---|---|---|---|
| 7,530,606 B1* | 5/2009 | Yang | F16L 37/0915 |
| | | | 285/308 |
| 7,533,907 B2 | 5/2009 | Swift et al. | |
| 7,963,570 B2* | 6/2011 | Swift | F16L 37/088 |
| | | | 285/308 |
| 8,297,658 B2* | 10/2012 | Le Quere | F16L 37/107 |
| | | | 285/308 |
| 2002/0109351 A1* | 8/2002 | Densel | F16L 37/088 |
| | | | 285/308 |
| 2003/0001386 A1 | 1/2003 | Cresswell et al. | |
| 2004/0096268 A1 | 5/2004 | Ohlsson | |
| 2006/0208484 A1* | 9/2006 | Swift | F16L 37/0847 |
| | | | 285/308 |
| 2008/0030025 A1* | 2/2008 | Vogel | F16L 37/1215 |
| | | | 285/308 |
| 2008/0315576 A1 | 12/2008 | Moretti et al. | |

FOREIGN PATENT DOCUMENTS

| | | |
|---|---|---|
| EP | 1770320 A1 | 4/2007 |
| JP | 4-56295 U | 5/1992 |
| JP | 7-239082 A | 9/1995 |

\* cited by examiner

QUICK CONNECT COUPLING WITH A SELF-RESETTING RETENTION MECHANISM

FIELD

The present disclosure relates generally to a quick connect and disconnect coupling ("quick connect coupling"), and more specifically to a quick connect coupling with a self-resetting stop.

BACKGROUND

Quick connect couplings typically include a female coupling and a male coupling configured to operably engage the female coupling. Example male couplings include couplers and plugs, and example female couplings include female couplers, sockets, and machined ports. The male and female couplings may be interconnected to a hydraulic hose, tubing, piping, machinery, or other apparatus for transporting fluid, which may be pressurized.

In general, pressing a portion of the male coupling into an internal port of the female coupling completes a fluid flow path. In some configurations, the male and female couplings are provided with complementary grooves for the receipt of a locking device, which may include a deformable ring or a collet-like device with moveable fingers. Upon insertion of the male coupling into the female coupling a predetermined distance, the locking device generally engages the grooves to axially lock the male and female couplings together. To disconnect the two components, the male coupling may be inserted a further distance into the female coupling until a release device disengages the locking device from one of the grooves. Then, the male coupling can be removed from the female coupling. Example quick connect couplings are discussed in U.S. Pat. No. 6,637,781 to Seymour; U.S. Pat. No. 7,014,215 to Cooper et al.; U.S. Pat. No. 7,469,933 to Swift et al.; and U.S. Pat. No. 7,533,907 to Swift et al., each of which is hereby incorporated by reference in its entirety. In the event that any portion of the above-incorporated applications is inconsistent with this application, this application supersedes the above-incorporated applications.

The quick connect/disconnect characteristic of quick connect couplings may result in a greater risk of inadvertent and sudden disconnects, which can lead to damaged or broken machinery, destroyed premises, catastrophic system failure, severe injuries, and even death. To combat an inadvertent disconnection of a quick connect coupling, some conventional couplings utilize a safety device generally referred to as a stop. The stop typically is associated with the male coupling and configured to substantially prevent the male coupling from being inserted into the female coupling beyond a predetermined distance, thereby preventing a release device from disengaging a locking device. Conventionally, the stop must be removed to enable disconnection of the male coupling from the female coupling.

SUMMARY

Quick connect couplings are commonly utilized with high pressure fluids. Hence, safety and operational considerations are paramount since an inadvertent disconnection of the coupling may result in serious injury or system failure. The present disclosure is generally directed to a quick connect coupling configured to substantially prevent inadvertent disconnections.

It is one aspect of the present disclosure to provide a quick connect coupling comprising a male coupling and a female coupling. The quick connect coupling may include a locking device configured to secure the male coupling within an internal port of the female coupling, and a release device configured to selectively disengage the locking device. The quick connect coupling may utilize any locking and/or release device known in the art. In some embodiments, the quick connect coupling is configured as a push-to-connect and a push-to-disconnect coupling. In these embodiments, the male coupling is inserted into the female coupling a first predetermined distance to actuate a locking device that secures the male coupling within an internal port of the female coupling. To disconnect the quick connect coupling, the male coupling is inserted a second further distance into the female coupling to actuate a release device that disengages the locking device, thereby enabling the male coupling to be axially separated from the female coupling. The male and female couplings may be interconnected to a hydraulic hose, tubing, piping, machinery, or other apparatus for transporting fluid, which may be pressurized.

It is another aspect of the present disclosure to provide a quick connect coupling utilizing a safety device configured to substantially prevent actuation of a release device. In some embodiments, a quick connect coupling includes a stop that operatively restricts the ability of a release device to be actuated. For example, the stop may be associated with a male coupling and configured to prevent a release device from engaging a locking device.

It is yet another aspect of the present disclosure to provide a quick connect coupling utilizing a safety device that is axially secured to a male coupling in a certain position. In some embodiments, the quick connect coupling includes a "stop" or retention mechanism that is axially secured to a male coupling in a predefined position to allow connection of the male coupling and a female coupling while preventing disconnection of the couplings. In one embodiment, the stop includes a protrusion that selectively engages a recessed area of the male coupling. For example, the stop may include a circumferential ridge configured to seat within an annular groove formed in the male coupling. In another embodiment, the male coupling includes a protrusion that restricts the stop. For example, the male coupling may include a shoulder configured to substantially prevent axial displacement of the stop in at least one direction relative to a longitudinal axis of the male coupling. The stop and/or male coupling may include other features configured to axially secure the stop to the male coupling.

It is yet a further aspect of the present disclosure to provide a quick connect coupling utilizing a safety device configured to move axially relative to a male coupling. In some embodiments, a quick connect coupling includes a stop that is axially displaceable along a longitudinal axis of a male coupling between a first position and a second position. The first position may correspond to a connect position, and the second position may correspond to a disconnect position. When in the first position, the stop may permit insertion of a male coupling into a female coupling a predetermined distance configured to enable actuation of a locking device while preventing actuation of a release device. When in the second position, the stop may permit insertion of the male coupling into the female coupling a predetermined distance configured to enable actuation of a release device, thereby allowing disconnection of the male and female couplings. To permit axial displacement of the stop along a longitudinal axis of the male coupling, the stop may be radially expanded, rotated, manipulated in other manners, or any combination thereof.

In one embodiment of the present disclosure, a quick connect hydraulic coupling with a retention mechanism to prevent inadvertent disconnection is provided, the quick connect hydraulic coupling comprising a female coupling with an external surface and an internal surface which defines a port, a male coupling having an external surface, an internal surface, a leading edge, a longitudinal axis, and a geometric profile adapted for insertion into said female coupling. A retention mechanism is disposed at least partially around the external surface of the male coupling and configured to prevent the male coupling from being inserted into said port of the female coupling beyond a predetermined position. The retention mechanism is slidable relative to the longitudinal axis of the male coupling between a first position and a second position, the first position located between the leading edge of the male coupling and the second position, and the retention mechanism biased towards the first position so that the retention mechanism resets to the first position upon removal of an insertion force.

It is another aspect of the present disclosure to provide a quick connect coupling utilizing a slidable safety device configured to automatically reset to a predefined position. In some embodiments, a quick connect coupling includes a stop that is slidably disposed about a male coupling and biased towards a certain position. In some embodiments, the male coupling may include a feature configured to bias the stop towards a first position, which may correspond to a position of connection. For example, the male coupling may include an inclined surface disposed between a first position and a second position, which may correspond to a position of disconnection. As the stop is moved from the first position to the second position, the inclined surface radially expands the stop, thereby biasing the stop towards the first position. The inclined surface may be linear, arcuate, or both. If linear, the inclined surface may be angled, for example, between about 5 degrees and 75 degrees relative to a longitudinal axis of the male coupling. In addition, or alternatively, a biasing element, such as a spring, may be associated with the male and/or female coupling and configured to bias the stop towards the first position. Example springs include a compression spring, an extension spring, a disc spring, such as a Belleville or wave washer, a torsion spring, or any combination thereof. The biasing force may be linear, non-linear, or both.

In one embodiment of the present disclosure, a method for selectively engaging or disengaging of a metallic hydraulic coupling is provided, the method comprising providing a female coupling with an external surface, an interior surface and a leading edge which defines a port. Additionally, a male coupling is provided, the male coupling comprising an exterior surface, an internal surface which defines a flow path, and a leading edge sized for insertion into said port of said female coupling. A locking mechanism is also provided, the locking mechanism operably positioned proximate to said external surface of said male coupling and said internal surface of said female coupling and which can be selectively actuated and released upon the insertion and retraction of the male coupling within the female coupling. A stop is provided and positioned between the female coupling leading edge and a shoulder extending outwardly from the exterior surface of the male coupling, said stop having a first locking position which prevents any travel of the male coupling within the female coupling, and a second released position which allows the male coupling to travel further within said female port to disengage said locking mechanism and allow the removal of said male coupling from said female coupling.

It is another aspect of the present disclosure to provide a safety device that may be formed in various configurations and shapes. In some embodiments, a stop may be formed in a generally cylindrical shape with an inner surface, an outer surface, and side surfaces extending radially between the inner and outer surfaces. In some embodiments, the stop may be a generally cylindrical ring with a substantially circular cross-section. In some embodiments, the stop may be a discontinuous ring having ends.

It is another aspect of the present disclosure to provide a quick connect coupling constructed of commonly known materials. For example, a male coupling, a female coupling, and a stop may be constructed of metallic and/or non-metallic materials. In some embodiments, the male and female couplings are constructed of steel, aluminum, brass, combinations thereof, or any other suitable material known in the art. In some embodiments, the stop is constructed of steel, aluminum, silicone, plastic, fiberglass, combinations thereof, or any other suitable material known in the art.

The present disclosure can provide a number of advantages depending on the particular aspect, embodiment, and/or configuration. For example, in conventional quick connect couplings, stops generally are removed from the coupling to enable disconnection of a male coupling from a female coupling. Once removed, the stop often is misplaced or lost, resulting in downtime until the stop is found or a new stop is obtained. Embodiments of the present disclosure provide a quick connect coupling with a selectively slidable stop configured to permit disconnection of the coupling without removing the stop from the coupling, thereby ensuring the stop is not misplaced or lost. In addition, the stop may be biased towards a disconnect prevention position. Thus, upon disconnection of the quick connect coupling, the stop may automatically reset to a connect position in which a male coupling can be axially secured within a female coupling, but, once secured, the male coupling cannot be disconnected from the female coupling without a repositioning of the stop. Thus, in some embodiments, the stop may self-reset to a certain position to reduce, if not eliminate, inadvertent disconnections of a quick connect coupling. These and other advantages will be apparent from the disclosure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof are open-ended and can be used interchangeably herein.

The terms "first" and "second," as used herein, are not intended to connote importance or priority, but are used to distinguish one feature from another.

The term "automatic" and variations thereof, as used herein, refers to any process or operation done without material human input when the process or operation is performed. For example, a stop may be provided that automatically resets to a predetermined position without human assistance or intervention.

It shall be understood that the term "means," as used herein, shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description. The above and other objects advantages and features will become more readily understood from a consideration of the following detailed description when taken together with the accompanying drawings.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

Figure 1:
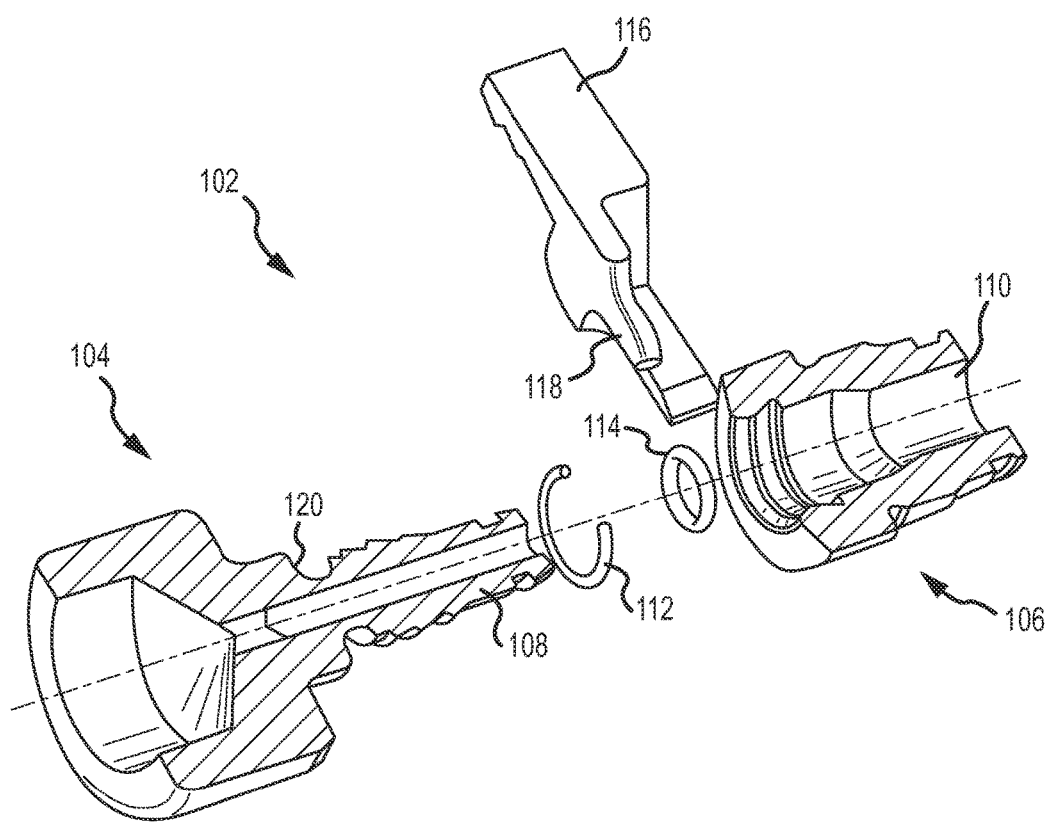
FIG. 1 is an exploded cross-sectional view of a prior art quick connect coupling utilizing a stop.

It should be understood that the drawings are not necessarily to scale. In certain instances, details that are not necessary for an understanding of the disclosure or that render other details difficult to perceive may have been omitted. It should be understood that the claimed subject matter is not necessarily limited to the particular embodiments illustrated herein.

To assist in the understanding of the drawings, the following is a list of components and associated numbering found in the drawings:

| # | Components |
|---|---|
| 2 | Quick connect coupling |
| 4 | Male coupling |
| 6 | Female coupling |
| 8 | Stem |
| 12 | Snap ring |
| 14 | Seal |
| 16 | Stop |
| 18 | Rod |
| 20 | Channel |
| 22 | Release groove |
| 24 | Snap ring groove |
| 26 | External surface |
| 28 | Sleeve |
| 30 | Leading edge |
| 32 | Longitudinal axis |
| 34 | Shoulder |
| 36 | Port face |
| 38 | Protrusion |
| 40 | Inner surface |
| 42 | Groove |
| 44a, b | Ends |
| 46 | Outer surface |
| 48 | Inclined surface |
| 50 | Space |
| 52 | Tab |

DETAILED DESCRIPTION

Although some embodiments will now be described with reference to the drawings, it should be understood that the embodiments shown are by way of example only and are merely illustrative of some of the many possible specific embodiments which can represent applications of the principles of the disclosure. Various changes and modifications, obvious to one skilled in the art to which the claimed subject matter pertains, are deemed to be within the spirit, scope and contemplation of the disclosure as further defined in the appended claims.

Referring now to FIG. 1, an example prior art quick connect coupling 102 is shown. The quick connect coupling 102 includes a male coupling 104 configured to operably engage a female coupling 106. The male coupling 104 is a cylindrically-shaped member having an outer diameter and an inner diameter. The male coupling 104 includes a stem 108 with an outer diameter that is generally less than a diameter of an internal port 110 of the female coupling 106 to allow selective engagement and disengagement of the male and female couplings 104, 106. A plurality of grooves may be formed in an outer surface of the stem 108 to seat at least one locking device, depicted as a snap ring 112, and/or at least one seal 114.

In order to lock the male coupling 104 within the female coupling 106, a locking device initially may be associated with a groove formed in an outer surface of the stem 108 or an inner surface of the port 110. Generally, the locking device, depicted as a snap ring 112, is radially deformed upon insertion of the stem 108 into the port 110. Once the stem 108 is inserted into the port 110 a predetermined depth, the snap ring 112 aligns with a groove formed in an opposing surface of the stem 108 or port 110 and returns to an undeformed state in which the snap ring 112 is positioned partially within both of the grooves to lock the couplings 104, 106 together. To disconnect the couplings 104, 106, a release device may be actuated to deform the snap ring 112 into one of the grooves, thereby permitting disconnection of the male and female couplings 104, 106. In some configurations, the release device is actuated by further insertion of the stem 108 into the port 110.

In order to maintain the integrity of the quick connect coupling 102, a detachable retention mechanism or stop 116 may be used to prevent unwanted insertion of the stem 108 into the port 110, thereby preventing inadvertent disconnection of male and female couplings 104, 106. The prior art detachable stop 116 depicted in FIG. 1 includes an arcuate-shaped rod 118 configured to engage a channel 120 formed in an outer surface of the stem 108 and prevent the stem 108 from being inserted into the port 110 beyond a predetermined depth. Thus, to disconnect the male coupler 104 from the female coupler 106, the depicted stop 116 is removed from the male coupling 104. Many times, after removal, the stop 116 is misplaced and/or lost. Thus, unless the stop is found or a new stop obtained, the male coupling 104 may be reconnected to the female coupling 106 without the stop 116. In these situations, the safety of the quick connect coupling 102 is compromised and pressurization or inadvertent contact with the male coupling 106 may disengage the quick connect coupling 102 and potentially cause property damage, injury, and/or loss of life. Further, pressurization of the hydraulic hose and associated fitting may also result in an inadvertent disconnection and safety concern(s).

Figure 2A:
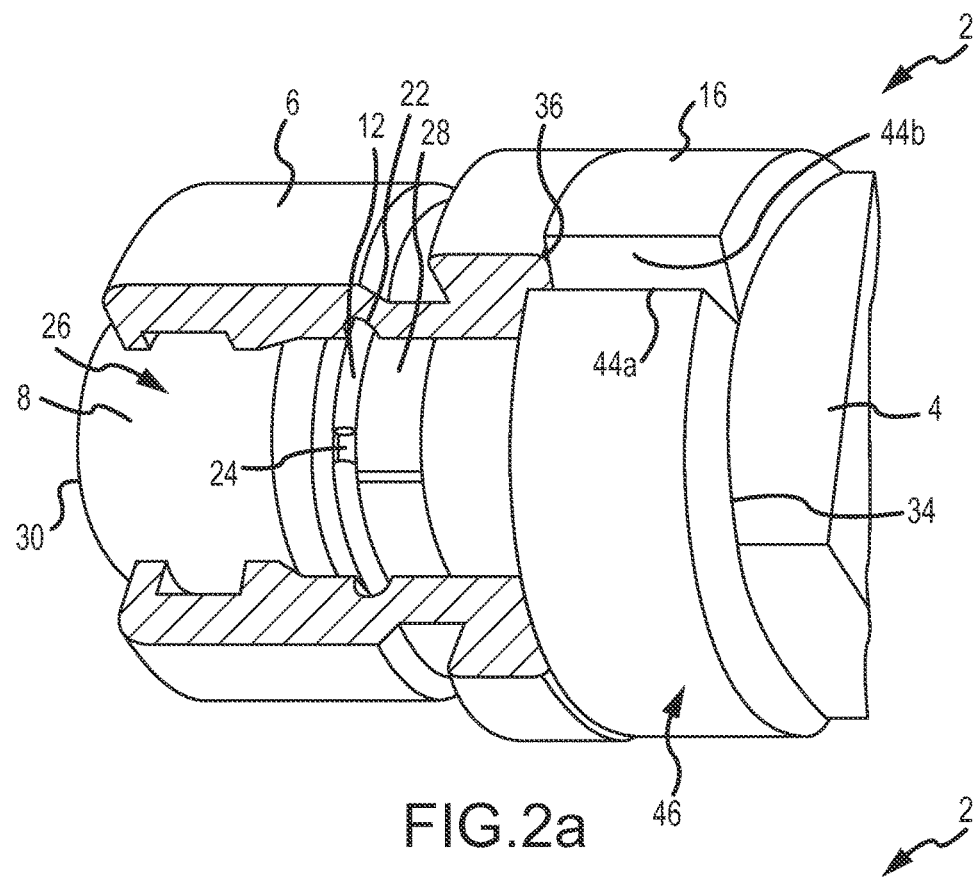
FIGS. 2a-2d are perspective views of a quick connect coupling utilizing a stop according to one embodiment of the present disclosure.
Figure 2B:
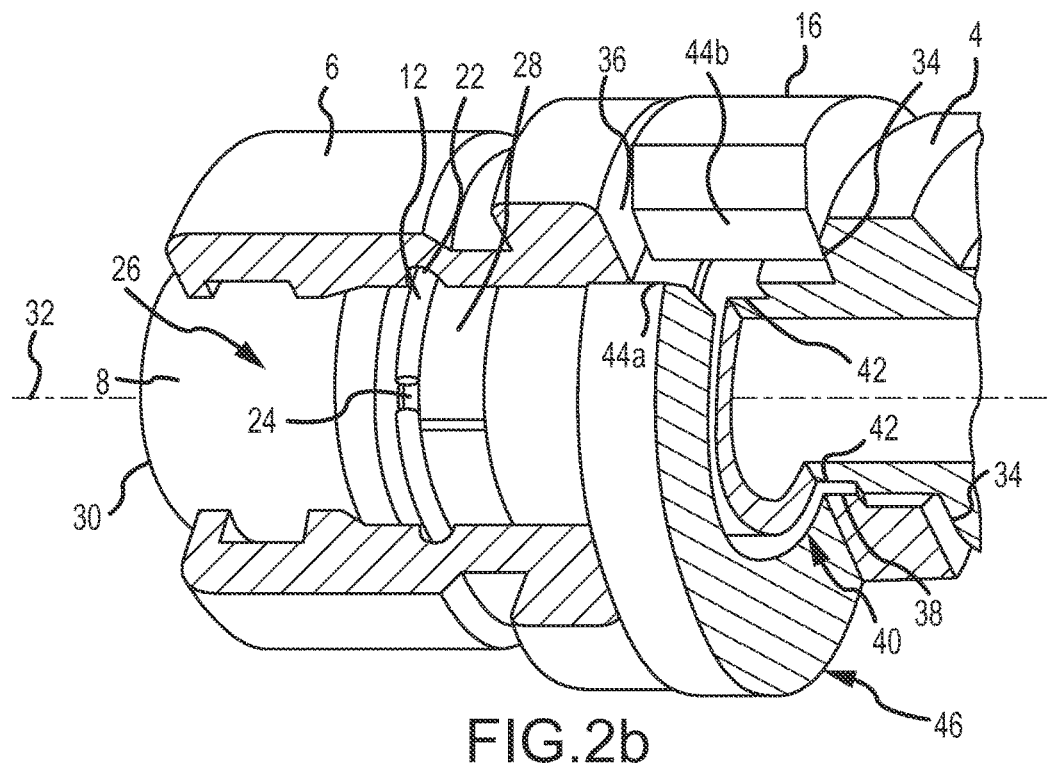

Referring to FIGS. 2a-2d, a quick connect coupling 2 with a stop 16 according to one embodiment of the present disclosure is provided. In particular, FIGS. 2a-2d illustrate a stop 16 during connection and disconnection of a quick connect coupling 2. In FIG. 2a, the quick connect coupling 2 is in a connected state in which a locking device, particularly a snap ring 12, prevents disconnection of the male coupling 4 from the female coupling 6. In the depicted connected state, the snap ring 12 is partially disposed within both a release groove 22 formed in an interior surface of the female coupling 6 and a snap ring groove 24 formed in an external surface 26 of the male coupling 4. Adjacent to the snap ring 12, a release device, particularly a sleeve 28, is disposed about the external surface 26 of the male coupling 4. The sleeve 28 is configured to deflect the snap ring 12 into the release groove 22 upon insertion of the male coupling 4 into the female coupling 6 a predetermined distance, thereby enabling disconnection of the quick connect coupling 2. In the connected state, the snap ring 12 is positioned axially between a leading edge 30 of the male coupling 4 and the sleeve 28 relative to a longitudinal axis 32 of the male coupling 4. Although one type of locking device and release device is provided for illustrative purposes, other locking and release devices known in the quick connect coupling field may be utilized to lock and release the male and female couplings 4, 6.

Still referring to FIG. 2a, the example quick connect coupling 2 includes a stop 16 disposed about the male coupling 4. The stop 16 is configured to prevent the male coupling 4 from being inadvertently inserted into the female coupling 6 beyond a predetermined depth, thereby substantially preventing the quick connect coupling 2 from being inadvertently disconnected. In FIG. 2a, the stop 16 is positioned between a shoulder 34 of the male coupling 4 and a port face 36 of the female coupling 6. When the quick connect coupling 2 is in a locked state, such as in FIG. 2a, the stop 16 may abut, or bear against, the port face 36 of the female coupling 6.

In some embodiments, the stop 16 is axially secured to the male coupler 4 in a certain position to substantially prevent the male coupling 4 from being inserted into the female coupling beyond a connection depth. In some embodiments, such as the embodiment depicted in FIG. 2b, the stop 16 may include a protrusion 38 extending inwardly from an inner surface 40. The protrusion 38 may be configured to seat within a recessed area, depicted in FIG. 2b as a groove 42, to substantially prevent axial movement of the stop 16 relative to the longitudinal axis 32 toward or away from the leading edge 30 of the male coupling 4. When the protrusion 38 is seated within the groove 42, the stop 16, in combination with the port face 36, substantially prevents the male coupling 4 from being further inserted into the female coupling 6, thereby preventing inadvertent actuation of the sleeve 28. In some embodiments, the male coupling 4 may include a shoulder or other protrusion configured to prevent axial displacement of the stop 16 in a direction away from the leading edge 30 of the male coupling 4.

In some embodiments, the stop 16 is repositioned to enable disconnection of the male coupling 4 from the female coupling 6. For example, referring to FIG. 2b, the stop 16 has been expanded to unseat the protrusion 38 from the groove 42, thereby permitting the male coupling 4 to be further inserted into the female coupling 6. Further insertion of the male coupling 4 into the female coupling 6 releases the locking device 12, thereby enabling disconnection of the quick connect coupling 2. To unseat the protrusion 38 from the groove 42, the ends 44a, b of the stop 16 may be separated from each other to increase an inner radius of the stop 16. Various apparatus may be utilized to expand the stop 16. For example, a screwdriver or other tool may be inserted between the ends 44a, b to separate the ends. A user's finger also may be utilized. In addition, each end 44a, b of the stop 16 may include a chamfered or beveled edge to assist in separating the ends of stop 16. Further, protuberances may be associated with an outer surface of the stop 16 to facilitate expansion of the stop 16. Once the inner radius of the stop 16 is expanded to a predetermined radius, the protrusion 38 unseats from the groove 42, thereby allowing the male coupling 4 to be further inserted into the female coupling 6 to actuate the sleeve 28.

Figure 2C:
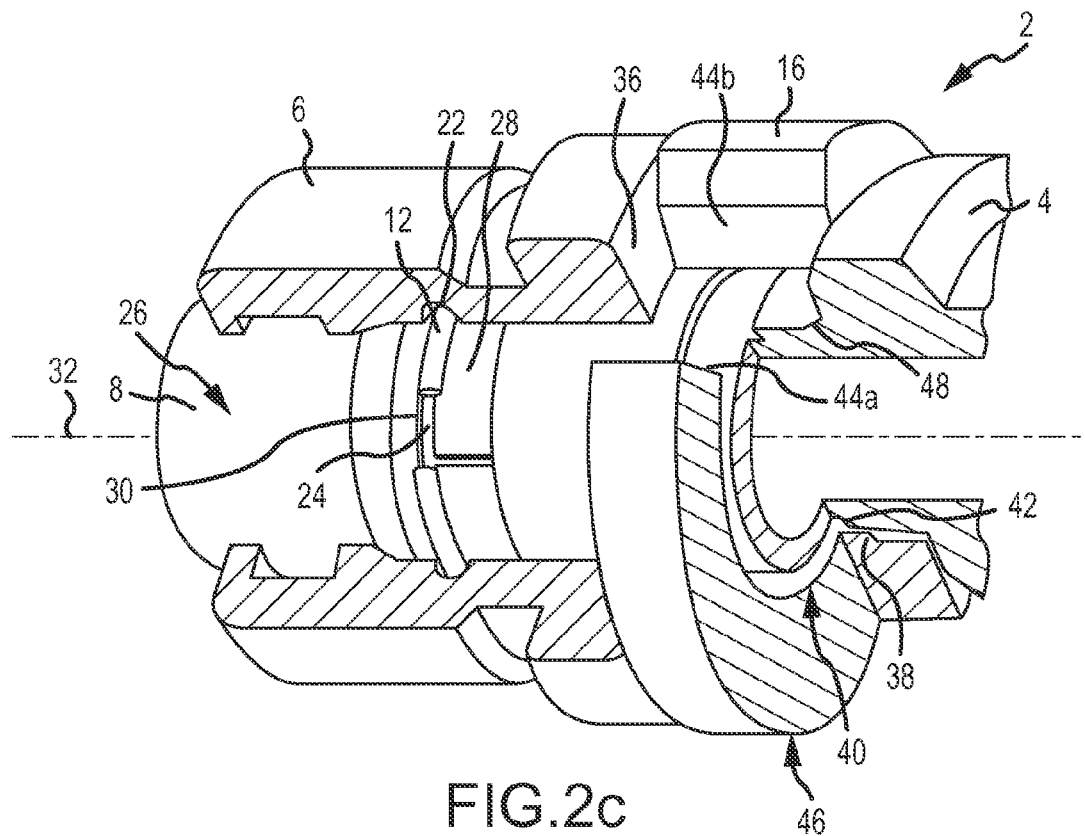

In the example quick connect coupling 2, upon further insertion of the male coupling 4 into the female coupling 6, the sleeve 28 disengages the snap ring 12 from the snap ring groove 24. As depicted in FIG. 2c, the male coupling 4 has been further inserted into the female coupling 6, which in turn has caused the sleeve 28 to expand the snap ring 12, thereby unseating the snap ring 12 from the snap ring groove 24 formed in the male coupling 4. In some embodiments, the stop 16 may substantially prevent the male coupling 4 from being inserted into the female coupling 6 beyond a disconnect position. For example, referring to FIG. 2c, the radially-expanded stop 16 is interposed between the port face 36 of the female coupling 6 and the shoulder 34 of the male coupling 4. More specifically, the radially-expanded stop 16 abuts the port face 36 on one side and the shoulder 34 on the other side, thereby preventing insertion of the male coupling 4 into the port beyond a position of coupling disconnection.

Figure 2D:
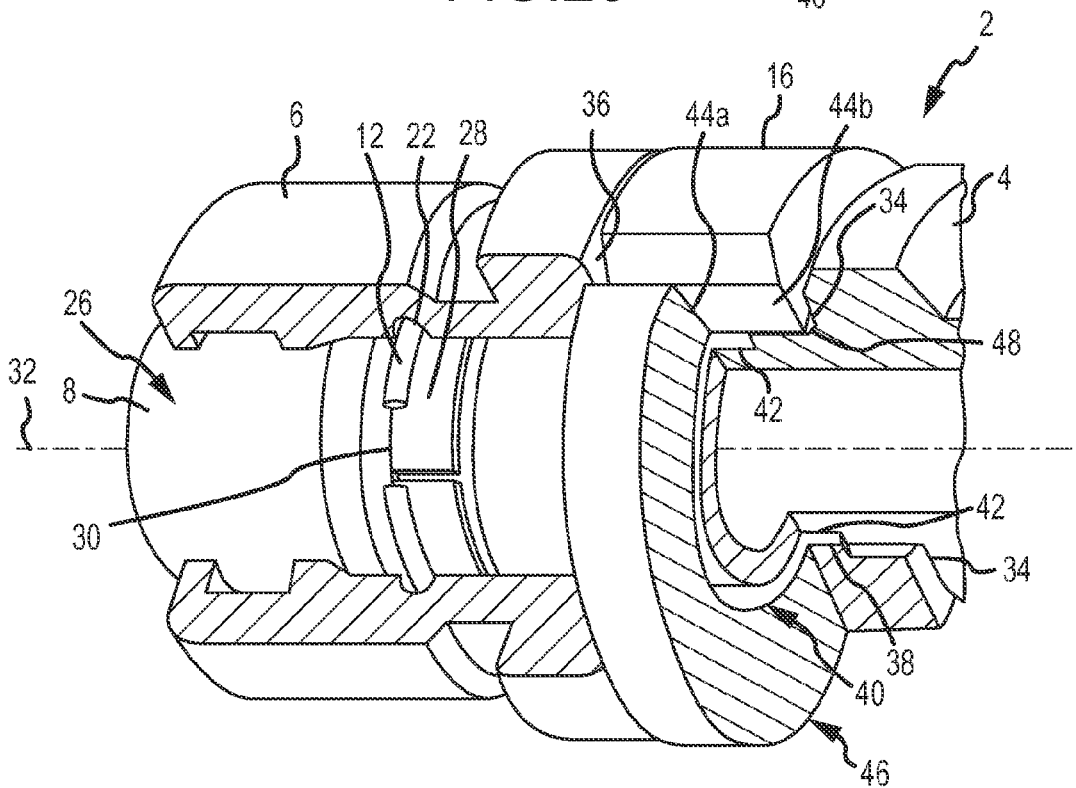

In the fully inserted position depicted in FIG. 2c, the snap ring 12 resides on the sleeve 28. Thus, referring to FIGS. 2c-2d, upon removal of the male coupling 4 from the female coupling 6, the sleeve 28 slides toward the leading edge 30 of the male coupling 4 to prevent the snap ring 12 from re-seating in the snap ring groove 24, thereby enabling separation of the quick connect coupling 2. As illustrated in FIG. 2d, upon removal of an insertion force on the stop 16, the stop 16 automatically resets to its initial position in which the protrusion 38 is seated in the groove 42.

Figure 3:
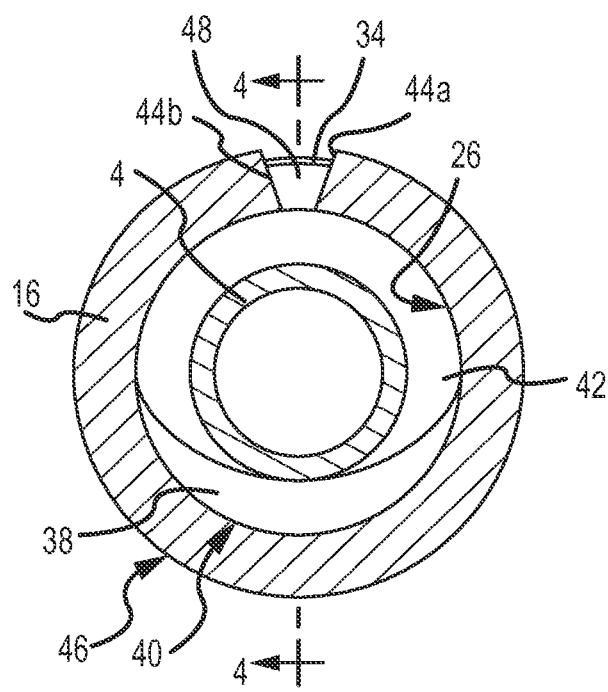
FIG. 3 is a front elevation cross-sectional view of a quick connect coupling utilizing a stop according to one embodiment of the present disclosure.

Referring to FIG. 3, a front elevation cross-sectional view of one embodiment of a quick connect coupling 2 with a stop 16 disposed about a male coupling 4 is provided. The example stop 16 depicted in FIG. 3 is a substantially cylindrical, non-continuous ring having a pair of ends 44a,

*b*. The stop 16 includes an inner surface 40 and an outer surface 46. The inner surface 40 is disposed radially adjacent to an external surface 26 of the male coupling 4. A protrusion 38 extends inward from the inner surface 40 of the stop 16 and is positioned within a groove 42 formed in the external surface 26 of the male coupling 4. The example protrusion 38 extends partially around the inner surface 40 of the stop 16. In certain embodiments, the protrusion 38 may be formed in various shapes and may extend around the inner surface 40. Similarly, although depicted as extending around the entire periphery of the male coupling 4, the recessed area, depicted as a groove 42, may extend around the periphery of the male coupling 4. For example, a recessed area may be formed in a discrete location on the external surface 26 of the male coupling 4 and selectively dimensioned to accommodate the protrusion 38, whatever shape it may be. To unseat the protrusion 38 from the groove 42, the stop 16 may be radially deformed until an internal bore of the stop 16 has a diameter at least as large as an outer diameter of the adjacent portion of the male coupling 4. Then, the male coupling 4 can be slid within the internal bore of the stop along a longitudinal axis 32 to disconnect the male coupling 4 from the female coupling 6.

Figure 4:
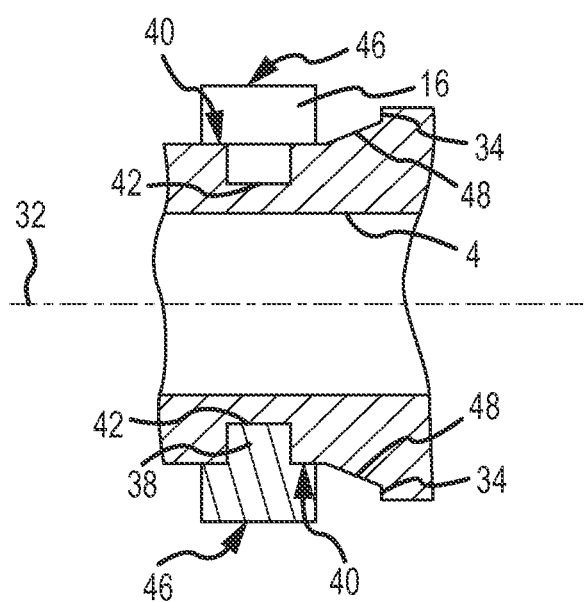
FIG. 4 is a cross-sectional view of the quick connect coupling of FIG. 3 taken along line 4-4.

In some embodiments, the stop 16 may be biased towards a first position so that the stop 16 substantially self resets to a first position upon removal of an external force. Referring to FIG. 4, the stop 16 is disposed in a first position in which the stop is axially secured to the male coupling 4 relative to the longitudinal axis 32. In the example configuration, a protrusion 38 is disposed in a groove 42 to axially secure the stop 16 to the male coupling 4. In the first position, the stop 16 is positioned a first predetermined distance from the leading edge 30 of the male coupling 4 to permit the male coupling 4 to operably engage a female coupling 6 and activate a locking device. When in the first position, the stop substantially prevents the male coupling 4 from being inserted into the female coupling 6 a further distance to actuate a release device and disconnect the quick connect coupling 2. Thus, in the first position, the stop 16 substantially prevents inadvertent disengagement of the quick connect coupling 2.

Once the stop 16 is unseated from the male coupling 4, the stop 16 is slidable relative to the longitudinal axis 32 of the male coupling 4 between a first position and a second position, where the stop 16 abuts a shoulder 34 of the male coupling 4. The shoulder 34 is configured to substantially prevent further displacement of the stop 16 along the external surface 26 of the male coupling 4. In the second position, the stop 16 is positioned a second predetermined distance from the leading edge 30 of the male coupling 4 to permit the male coupling 4 to activate a release device that enables disconnection of the quick connect coupling 2. Thus, in some embodiments, the axial distance between the first position and the leading edge 30 of the male coupling 4 is less than the axial distance between the second position and the leading edge 30 of the male coupling 4. In other words, the first position is located between the leading edge 30 of the male coupling 4 and the second position.

Still referring to FIG. 4, the male coupling 4 may include an inclined surface 48 positioned axially between the first position and the second position. The inclined surface 48 increases in diameter as the distance from the leading edge 30 of the male coupling 4 increases. As the stop 16 is forced up the inclined surface 48 during insertion of the male coupling 4 into the female coupling 6 to effect a release of a locking device, the stop 16 is expanded into a higher internal stress state. Upon removal of the insertion force, the internal stress of the stop 16 radially contracts the stop 16, thereby moving the stop 16 down the inclined surface 48 to the first position, where the stop 16 is in a lower internal stress state. Thus, upon removal of the insertion force, the stop 16 substantially self-resets to the first position.

Figure 5A:
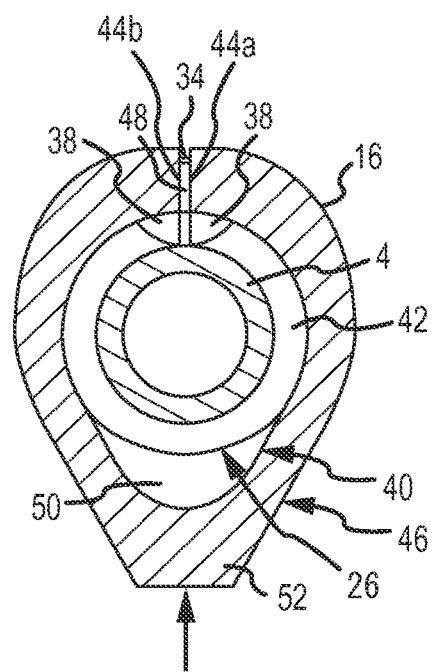
FIG. 5a is a front elevation cross-sectional view of a quick connect coupling utilizing a stop according to one embodiment of the present disclosure.
Figure 5B:
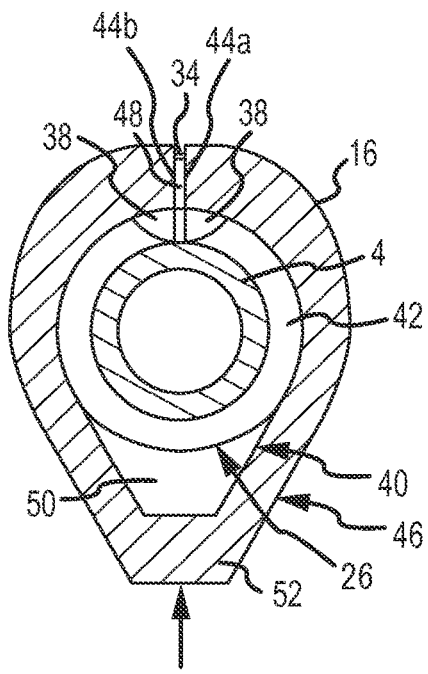
FIG. 5b is a front elevation cross-sectional view of a quick connect coupling utilizing a stop according to one embodiment of the present disclosure.

With reference to FIG. 5*a*, a front elevation cross-sectional view of one embodiment of a quick connect coupling 2 with a resettable stop 16 is provided. The example stop 16 depicted in FIG. 5*a* is formed in a tear-drop shape in which a portion of the inner surface 40 of the stop 16 abuts the external surface 26 of the male coupling 4 and a portion of the inner surface 40 of the stop 16 is spaced laterally apart from the external surface 26 of the male coupling 4. The abutting portion of the inner surface 40 of the stop 16 generally defines a substantially circular bore configured to contour around the external surface 26 of the male coupling 4 when the stop 16 is in a first position, as depicted in FIG. 5*a*. The spaced apart portion of the inner surface 40 of the stop 16 has a radius of curvature that is less than a radius of curvature of the external surface 26 of the male coupling 4 and generally defines a space 50 between the stop 16 and the male coupling 4 when the stop 16 is in a first position. Although FIG. 5*a* depicts one embodiment wherein the inner surface 40 comprises a curvilinear shape, the present invention is not so limited. For example, an alternative embodiment is contemplated wherein the inner surface 40 comprises straight sidewalls intersecting a horizontal bottom portion, thus forming intersections between the sidewalls and bottom portion at an angle greater than ninety degrees. For example, and as shown in FIG. 5*b*, the inner surface of the stop 16 could have substantially linear wall portions to define a trapezoid or other similar geometric configuration.

Still referring to FIG. 5*a*, the example stop 16 includes a tab 52 and at least one protrusion 38 extending inward from the inner surface 40. The tab 52 may be formed on an opposite side of the stop 16 relative to the ends 44*a, b*, and a protrusion 38 may be associated with each end 44*a, b* of the stop 16. By pressing the tab 52 in the direction of the arrow, which is substantially perpendicular to the longitudinal axis 32 of the male coupling 4, the space 50 between the tab 52 and the external surface 26 of the male coupling is decreased. As the space 50 is decreased, the external surface 26 of the male coupling 4 contacts the inner surface 40 of the stop 16 associated with the tab 52, the stop 16 elastically deforms about the external surface 26 of the male coupling 4, and the ends 44*a, b* of the stop 16 separate.

The space 50 between the tab 52 and the male coupling 4 may be dimensioned to unseat the protrusion 38 from the groove 42 upon a predetermined displacement. For example, in one embodiment, the protrusion 38 associated with each end 44*a, b* unseats from the groove 42 when the inner surface 40 of the stop 16 associated with the tab 52 abuts the external surface 26 of the male coupling 4. In addition, or alternatively, the protrusion 38 associated with each end 44*a, b* may unseat from the groove 42 upon a predetermined amount of force applied to the tab 52 in a direction substantially perpendicular to the longitudinal axis 32. Once each protrusion 38 is unseated from the groove 42, the male coupling 4 may be axially travelable within the stop 16. In other words, the stop 16 may be slidable about the external surface 26 of the male coupling 4. As previously discussed, the male coupling 4 may include a ramp portion that biases the stop 16 towards a position that enables coupling connection but prevents inadvertent coupling disconnection.

In operation, a stop 16 may be disposed at least partially around an external surface 26 of a male coupling 4. The stop 16 may be slidable between a first position and a second position. When in the first position, the stop 16 may substantially prevent the male coupling 4 from being inserted into a female port beyond a predetermined depth, which may correspond to a position of connection. Upon repositioning of the stop 16, the male coupling 4 may be inserted a further distance into the port to disengage a locking device. During the further insertion of the male coupling 4 into the port, a port face 36 may contact the stop 16 and force the stop 16 towards a second position, which may correspond to a position of disconnection. Once at the second position, the stop 16 may contact a feature on the male coupling 4 to substantially prevent further axial displacement of the male coupling 4 into the port. Once the driving force that moves the stop 16 relative to the male coupling 4 is removed, the stop 16 may automatically reset to the first position. In some embodiments, the external surface 26 of the male coupling 4 may include an inclined segment and/or a spring (not shown) to bias the stop 16 toward the first position. The biasing force may be linear and/or non-linear.

The foregoing discussion has been presented for purposes of illustration and description and is not intended to limit the disclosure to the form or forms disclosed herein. Further, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A quick connect hydraulic coupling with a retention mechanism to prevent inadvertent disconnection, comprising:
   a female coupling with an external surface and an internal surface which defines a port;
   a male coupling having an external surface, an internal surface, a leading edge, a longitudinal axis, and a geometric profile adapted for insertion into said female coupling; and
   a stop mechanism disposed at least partially around the external surface of the male coupling and configured to prevent the male coupling from being inserted into said port of the female coupling beyond a predetermined position, the stop mechanism slidable relative to the longitudinal axis of the male coupling between a first position and a second position, the first position located between the leading edge of the male coupling and the second position, the stop mechanism biased towards the first position so that the stop mechanism resets to the first position upon removal of an insertion force;
   wherein when in the first position, the stop mechanism is incapable of sliding toward the second position without a repositioning of the stop mechanism; and
   wherein the external surface of the male coupling has an annular groove and the stop mechanism has an internal surface with a protrusion extending inwardly, wherein when the stop mechanism is in the first position, the protrusion is seated in the groove to substantially prevent axial movement of the stop mechanism relative to the longitudinal axis.

2. The quick connect coupling of claim 1, wherein the stop mechanism is a discontinuous ring having two ends.

3. The quick connect coupling of claim 2, wherein the stop mechanism is substantially cylindrical.

4. The quick connect coupling of claim 2, wherein at least one of the two ends includes a chamfered edge.

5. The quick connect coupling of claim 2, wherein the protrusion is formed on an opposite side of the stop mechanism relative to the two ends.

6. The quick connect coupling of claim 1, wherein the protrusion extends radially inward from each of the ends.

7. The quick connect coupling of claim 1, wherein a portion of the stop mechanism is spaced laterally apart from an external surface of the male coupling to define a space between the stop mechanism and the male coupling.

8. The quick connect coupling of claim 7, wherein the stop mechanism is a discontinuous ring having two ends, and wherein the space is disposed on an opposite side of the stop mechanism relative to the two ends.

9. The quick connect coupling of claim 1, wherein the external surface of the male coupling includes an inclined surface disposed between the first position and the second position for biasing the stop mechanism towards the first position.

10. The quick connect coupling of claim 9, wherein the inclined surface is substantially linear.

11. The quick connect coupling of claim 1, wherein the external surface of the male coupling includes a shoulder configured to substantially prevent the stop mechanism from sliding axially beyond the second position.

12. The quick connect coupling of claim 11, wherein the shoulder is oriented in a substantially perpendicular plane relative to the longitudinal axis of said male coupling.

13. The quick connect coupling of claim 12, wherein when the stop mechanism is in the first position, the stop mechanism substantially abuts a port face of said female coupling.

14. The quick connect coupling of claim 1, wherein when the stop mechanism is in the second position, the stop mechanism is radially expanded relative to the first position.

15. The quick connect coupling of claim 1, wherein when the stop mechanism is in the second position, the stop mechanism is configured to permit disconnection of the male and female couplings.

16. The quick connect coupling of claim 15, wherein the external surface of the male coupling includes an inclined surface disposed between the first position and the second position for biasing the stop mechanism towards the first position.

17. A method for selectively engaging or disengaging of a metallic hydraulic coupling, comprising:
   providing a female coupling with an external surface, an internal surface and a leading edge which defines a female port;
   providing a male coupling with an external surface, an internal surface which defines a flow path, a longitudinal axis, and a leading edge sized for insertion into said female port;
   a locking mechanism operably positioned proximate to said external surface of said male coupling and said internal surface of said female coupling and which can be selectively actuated and released upon the insertion and retraction of the male coupling within the female coupling;

providing a stop mechanism positioned between the female coupling leading edge and a shoulder extending outwardly from the external surface of the male coupling, said stop mechanism slidable relative to the longitudinal axis of the male coupling between a first position and a second released position, wherein the stop mechanism when in the first position prevents any travel of the male coupling within the female coupling, and wherein said stop mechanism when in the second position allows the male coupling to travel further within the female port to disengage said locking mechanism and allow the removal of said male coupling from said female coupling;

the stop mechanism biased towards the first position so that the stop mechanism resets to the first position upon removal of an insertion force;

wherein when in the first position, the stop mechanism is incapable of sliding toward the second position without a repositioning of the stop mechanism; and wherein said stop has an internal surface with a protrusion extending inwardly, wherein when the stop is in the first position the protrusion is seated in a groove in the external surface of said male coupling to prevent axial movement of the stop relative to the longitudinal axis.

\* \* \* \* \*